3,375,118
**RIPENING CHEESE WITH FILBERT NUT EX-
TRACT AND *SACCHAROMYCES CEREVISIAE*
ENZYMATIC MATERIAL**
James P. Cox, Portland, Oreg., assignor to
Robert W. Beach, Seattle, Wash.
No Drawing. Filed Jan. 9, 1964, Ser. No. 336,645
13 Claims. (Cl. 99—116)

This invention relates to the production of cheese and particularly the production of cheddar cheese by enzymatic action, cheese-ripening material utilized in such process and the cheese resulting from such process.

A principal problem in the production of cheese, and particularly cheddar cheese, has been the necessity of storing the cheese for an extended period of time, such as from a month to a year, in order to obtain cheese of the desired texture and flavor. It has been difficult to produce cheese of uniform quality in any particular ripening period, but the ripening period for cheddar cheese has extended over a period of at least several months on the average. It has been proposed previously to expedite the ripening of cheese by the use of the enzymes trypsin, pepsin or erepsin, but such procedure has created two principal difficulties; first, that of the production of an objectionable flavor and second, the problem of inactivating the enzymes at the end of the desired ripening period so as to prevent early spoilage of the cheese.

A principal object of the present invention, therefore, is to expedite the ripening of cheese, particularly of the cheddar variety, by the action of enzyme cheese-ripening material of a type which will not impair the flavor of the cheese, but which may actually enhance its flavor while at the same time greatly expediting the ripening action of the cheese.

Another object is to exert more positive control over the ripening of cheese so that cheese of uniform qualtiy can be produced reliably during a ripening period of quite definite duration.

A further object is to control the cheese-ripening action so that such action can be terminated effectively at any desired time.

In the production of cheese it is a further object to inhibit the formation of mold following the production of the raw cheese.

It is also an object to expedite the ripening of cheese by the use of enzyme material which can be obtained economically and in adequate quantities to meet the demand.

In general, the raw cheese, such as cheddar cheese, is prepared in accordance with customary procedure and when it is ready for the ripening step, except for being wrapped, the blocks of cheese can be dipped in sorbic acid or ascorbic acid if it is desired to inhibit mold growth. Subsequent to such dipping or without such dipping, if desired, the raw cheese is subjected to the accelerated ripening action. Such action can be accomplished effectively by wrapping the cheese in an absorbent wrapping material, such as paper towel, toweling or absorbent cloth, impregnated with the cheese-ripening material. It is preferable for the cheese thus wrapped to be further covered with an outer wrapper of air impervious material. The cheese is then placed in storage for ripening for a period of 12 to 15 days. The ripening action can be terminated simply by removing the impregnated wrapper, after which the blocks of cheese are covered for market preferably by an air impervious covering such as a coating of wax or a transparent air impervious film, for example, polyethylene film.

The cheese-ripening agent which has been found to be satisfactory for the process of this invention preferably is an extract of filbert nuts and, alternatively or supplementally, enzymatic material of yeast designated *Saccharomyces cerevisiae*. Preferably the filbert nut enzyme cheese-ripening material is extracted from such nuts by leaching and thereafter the extract preferably is concentrated. Various procedures can be employed for preparing the enzyme cheese-ripening concentrate.

In the United States the most popular type of cheese is cheddar cheese and the ripening method of the present invention is particularly advantageous in expediting the ripening of such cheese. The preparation of the raw cheese can follow conventional procedure. A typical procedure includes warming milk to 30 degrees centigrade and adding a suitable starter containing bacteria which produces lactic acid. After mixing, rennet is added in an amount from 0.17 to 0.2 percent by weight of the milk, which results in curd being formed in 20 to 40 minutes. Such curd is cut into small cubes to allow the whey to separate and it is then heated to 38 degrees centigrade and agitated until the body is satisfactory in texture. The whey is then drained off and the curd is cut into large pieces which are stacked and turned periodically for drainage of the whey.

Next the cheddared curd is cut and milled into small pieces. Salt is mixed into the curd in the proportion of one and one-half pounds of salt to one thousand pounds of curd, although in some instances up to three and one-half pounds of salt per thousand pounds of curd can be added. The cheese is then pressed into blocks at room temperature and wrapped in cheesecloth. The yield will be approximately nine and one-half to eleven pounds of raw cheese for each one hundred pounds of milk.

If it is desired to inhibit mold growth the raw cheese can be dipped in sorbic acid or ascorbic acid after the whey has been mostly drained from it and before the cheese is wrapped or waxed to exclude the air from it. For ease of dipping the cheese should first have been wrapped in a pervious material, such as cheesecloth. Without such treatment mold may form on the cheese within a period of 4 or 5 days when exposed to the air, whereas such procedure will delay the formation of mold during exposure to the air for a period of 16 to 42 days.

Ripening of the cheese in accordance with the present process is accomplished by subjecting the cheese to cheese-ripening material in accordance with the present invention. For this purpose such material can be packed with the cheese, or sprayed on the cheese in the form of a solution, but preferably the blocks of cheese are simply wrapped in an absorbent wrapper impregnated with such material. Such wrapper may be the cheesecloth in which the cheese is wrapped prior to being dipped in the mold-inhibiting acid, if such treatment is used, or it can be toweling or other absorbent cloth, or absorbent paper, such as paper towel material. At the beginning of the ripening period the cheese blocks have a whey content of approximately 20 percent of the cheese by weight, which tends to bleed from the cheese during the early stages of ripening. In order to reduce dehydration of the cheese during the accelerated ripening action it is preferred to cover the cheese blocks with an outer air impervious covering of waxed paper, polyethylene film or similar material. During the ripening process carbon dioxide is produced by the cheese and such atmosphere also will be confined within the impervious wrapper.

Even for the production of mild cheddar cheese ordinarily the minimum ripening period should be two or three months; for medium cheddar cheese the ripening period will be six months to a year and for sharp cheddar cheese ripening period can be from nine months to eighteen months. Even sharp cheddar cheese will be produced by the ripening action in the present process in a period of twelve to fifteen days. At that time the ripening process can be interrupted simply by removing the impregnated wrapping. The cheese washed in water and then sealed either in wax or in an air-impervious wrapper. The completed cheese can then be stored until ready for use or shipped to stores for sale.

The cheese-ripening material useful in the present process is believed to be a special type of enzymatic material, probably proteinase, which, as far as known, has not previously been used in the process of ripening cheese. The most effective and consistent material known for this purpose is an extract of shelled filbert nuts. While such nuts can simple be, comminuted and packed with the cheese it is preferred that the enzyme cheese-ripening material be extracted from the nutmeat as a solution, or concentrate in the form of a solution, or powder. When used in the manner suggested above the solution should contain cheese-ripening in the proportion of approximately 1000 parts of solvent to one of dry material by weight, and the solvent preferably is water.

A satisfactory method of preparing the enzyme cheese-ripening extract or concentrate involves crushing filbert nuts and then comminuting them, such as in a blender. A small amount of salt should be added at this time, such as approximately one-tenth of one percent by weight. Such comminuting operation develops heat and it is important to limit the rise in temperature in order to preserve the cheese-ripening effectiveness of the enzyme material. Consequently during the comminuting process a heat-absorbing liquid such as water is added to the nut material from time to time in sufficient quantities and sufficiently often to prevent the temperature of the nut material from rising to a value higher than 50 degrees centigrade. The amount of water thus added during the comminuting operation should be from two to three times as much by weight as the weight of the nutmeat.

In order to extract enzyme cheese-ripening material most effectively the cell structure of the nutmeat material should be ruptured as much as possible. This result can be accomplished by mixing with the comminuted nutmeat material in a blender sharp glass particles, such as pulverized glass, which preferably is of the tempered type, such as Pyrex glass. The amount of such pulverized glass added to the nutmeat may be up to about 10 percent by weight of the nutmeat material.

The comminuting of the nutmeat material alone, and mixed with the pulverized glass, is continued until a milky suspension is formed which will contain enzyme cheese-ripening material liberated from the nutmeat. At this time it is preferred to add to the suspension a small amount of the yeast designated *Saccharomyces cerevisiae*, preferably in the proportion of one-tenth of a gram per pound of nutmeal material. Such yeast will be in powder form and can be mixed into the suspension by the blender in a few seconds. Such addition is, however, optional.

The next step is to separate the enzyme cheese-ripening material from the suspension. Such separation can be accomplished simply by filtering the suspension through filter paper, which may be of the number 2 type. The liquid filtrate contains the enzyme cheese-ripening material and if such solution is sufficiently concentrated it may be used directly to impregnate the absorptive wrapper for the cheese. Alternatively, such solution can be concentrated with ether or by natural evaporation in a dry atmosphere. The solution cannot be concentrated by heat above 50 degrees centigrade because such heat will destroy the cheese-ripening effectiveness of the enzyme material.

The process of concentrating the solution by the use of ether involves placing such solution in one vessel and the ether in another vessel at a lower elevation that the solution vessel and enclosing such vessels in an enclosure including a connecting conduit. Approximately three-quarters as much ether by weight as solution can be used. The ether is then alternately heated to approximately 35 degrees centigrade and cooled, which will alternately vaporize the ether which is absorbed by the solution and extracts enzyme cheese-ripening material from it. Such material condenses into fog in the downwardly inclined connecting conduit. From such conduit vapor can be vented from a higher opening and extract condensate fog can be withdrawn from a lower opening in the conduit. The enzyme cheese-ripening material thus extracted can be used to impregnate the absorbent wrapper for the cheese as discussed above.

Other procedures may be used for extracting the enzyme cheese-ripening material from the suspension, such as ion exchange, electrophoresis, electrodialysis, dialysis, ultracentrifugation, pervaporation, solvent extraction, adsorption by an adsorbent material such as kaolin, precipitation or crystallization. If the enzyme cheese-ripening material is finally extracted in concentrated liquid or solid form it will be necessary to dilute such material before it is used to impregnate the absorptive wrapping for the cheese.

An alternative type of enzyme cheese-ripening material which is reasonably effective, but not as effective as the fibert nut extract material discussed above, for expeditious ripening of cheese is yeast of the *Saccharmoyces cerevisiae* varity. To use such material the yeast is pulverized and mixed with water and a small amount of sugar at room temperature to initiate fermentation. After such fermentation has progressed for approximately 12 hours the resulting suspension is filtered and the filtrate contains proteinase. The absorbent wrapping material for the cheese can then be soaked in such filtrate to impregnate it with the enzyme cheese ripening material, as described previously.

As applied to the cheese the absorbent wrapping material impregnated with enzyme cheese ripening material should be somewhat damp, but the whey from the cheese will moisten such wrapping material even if it is not damp initially, so as to activate the ripening process. As has been mentioned previously, the ripening action can be terminated ordinarily simply by removing the impregnated wrapper from the cheese. If ripening action should continue to some extent the enzyme cheese-ripening material can be deactivated by placing the cheese in a container made of a heavy metal, such as zinc or lead, or by irradiating the cheese or subjecting it to ultrasonic vibration. While heating the cheese to a temperature above 50 degrees centigrade will deactivate the enzyme cheese-ripening material, such heating will melt the cheese or spoil its texture so as to destroy or greatly reduce its commercial value. Consequenly, this expedient for deactivating the enzyme cheese-ripening material is not practical.

I claim as my invention:

1. In the method of making cheese, the step of expediting ripening of unripened cheese including subjecting the cheese to the ripening action of material selected from the group consisting of filbert nut extract and *Saccharomyces cerevisiae* enzymatic material.

2. In the method of making cheese, the step of expediting ripening of unripened cheese including subjecting the cheese to the ripening action of fibert nut extract.

3. In the method of making cheese, the step of expediting ripening of unripened cheese including subjecting the cheese to the ripening action of *Saccharomyces cerevisiae* enzyme material.

4. In the method of making cheese, the step of expediting ripening of unripened cheese including subjecting the cheese to the ripening action of filbert nut extract and *Saccharomyces cerevisiae* enzyme material.

5. In the method of making cheese, the step of expediting ripening of unripened cheese including wrapping the cheese in an absorbent wrapper impregnated with filbert nut cheese-ripening extract.

6. In the method of making cheese, the step of expediting ripening of unripened cheese including wrapping the cheese in an absorbent wrapper impregnated with filbert nut cheese-ripening material, and enclosing such wrapped cheese in an air impervious outer wrapper.

7. Cheese-ripening filbert nut enzyme extract.

8. In the method of making cheese, the steps of inhibiting mold and expediting ripening of unripened cheese including dipping raw cheese in acid selected from the group consisting of sorbic acid and ascorbic acid, to deter molding, wrapping the cheese in an absorbent wrapper impregnated with filbert nut cheese-ripening material, and enclosing such wrapped cheese in an air impervious outer wrapper.

9. The method of making enzyme cheese-ripening material which comprises crushing shelled filbert nuts, and comminuating such crushed nuts while adding aqueous heat-absorbing liquid to such nuts to the extent required to maintain the temperature below about 50 degrees centigrade.

10. The method of making enzyme cheese-ripening material which comprises crushing shelled filbert nuts, comminuting such crushed nuts, while adding aqueous heat-absorbing liquid to such nuts to the extent required to maintain the temperature below about 50 degrees centigrade, whipping pulverized glass with such comminuted nuts, and filtering the mixture and recovering liquid filtrate containing enzyme cheese-ripening material.

11. The method of making cheese-ripening material which comprises crushing shelled filbert nuts, adding salt to the filbert nuts, comminuting such crushed nuts while adding water to such nuts to the extent required to maintain the temperature below about 50 degrees centigrade, whipping pulverized glass with such comminuted nuts, filtering the mixture and recovering aqueous filtrate containing cheese-ripening material, and concentrating the filtrate at a temperature below about 50 degrees centigrade.

12. The method of making cheese-ripening extract which comprises crushing shelled filbert nuts, comminuting such crushed nuts, adding aqueous heat-absorbing liquid to such nuts to the extent required to maintain the temperature below about 50 degrees centigrade, mixing *Saccharomyces cerevisiae* with the mixture of comminuted nuts and liquid, and extracting cheese-ripening material from such mixture.

13. The method of making cheese-ripening extract which comprises crushing shelled filbert nuts, adding salt to the filbert nuts, comminuting such crushed nuts while adding water to such nuts to the extent required to maintain the temperature below about 50 degrees centigrade, whipping pulverized glass with such nuts, mixing *Saccharomyces cerevisiae* with the mixture of comminuted nuts, pulverized glass and water, filtering the mixture and recovering aqueous filtrate containing cheese-ripening material, and concentrating the filtrate at a temperature below about 50 degrees centigrade.

References Cited
UNITED STATES PATENTS

| | | | |
|---|---|---|---|
| 1,322,194 | 11/1919 | McKee | 99—126 |
| 2,116,482 | 5/1938 | Von Friedrick | 195—66 |
| 2,471,867 | 5/1949 | Fisher et al. | 99—116 |
| 2,817,590 | 12/1957 | Traisman et al. | 99—117 |
| 2,946,688 | 7/1960 | Rosenthal et al. | 99—97 |
| 2,974,046 | 3/1961 | Perry et al. | 99—162 |
| 2,989,400 | 6/1961 | Baumann | 99—116 |
| 3,232,768 | 2/1966 | Van Wieren et al. | 99—162 |

A. LOUIS MONACELL, *Primary Examiner.*

D. M. STEPHENS, D. M. NAFF, *Assistant Examiners.*